United States Patent [19]

Chaput

[11] 3,852,977
[45] Dec. 10, 1974

[54] TORQUE TRANSFER DRIVE
[75] Inventor: Victor B. Chaput, Nashua, N.H.
[73] Assignee: Alex Simoneau, Nashua, N.H., a part interest
[22] Filed: Jan. 30, 1973
[21] Appl. No.: 328,101

[52] U.S. Cl............... 64/30 D, 64/6, 64/11 R, 64/26, 64/27 NM
[51] Int. Cl............................................ F16d 7/02
[58] Field of Search ...... 64/26, 27 NM, 27 R, 11 R, 64/30 D, 6; 192/58 B

[56] References Cited
UNITED STATES PATENTS

| | | | |
|---|---|---|---|
| 2,572,265 | 10/1951 | Johnson | 64/27 R |
| 2,640,899 | 6/1953 | Dickey | 64/26 |
| 2,812,648 | 11/1957 | Croset | 64/26 |
| 3,575,269 | 4/1971 | Sherman | 64/26 |
| 3,702,067 | 11/1972 | Stewart | 64/27 |
| 3,763,664 | 10/1973 | Stewart | 64/26 |

Primary Examiner—Samuel Scott
Assistant Examiner—Randall Heald
Attorney, Agent, or Firm—Richard I. Seligman

[57] ABSTRACT

A torque transfer drive includes opposed end plates connected to a driving and driven member with a silicone putty therebetween whereby torque will be applied to the driven member proportionately to the speed of the driving member.

1 Claim, 3 Drawing Figures

PATENTED DEC 10 1974  3,852,977
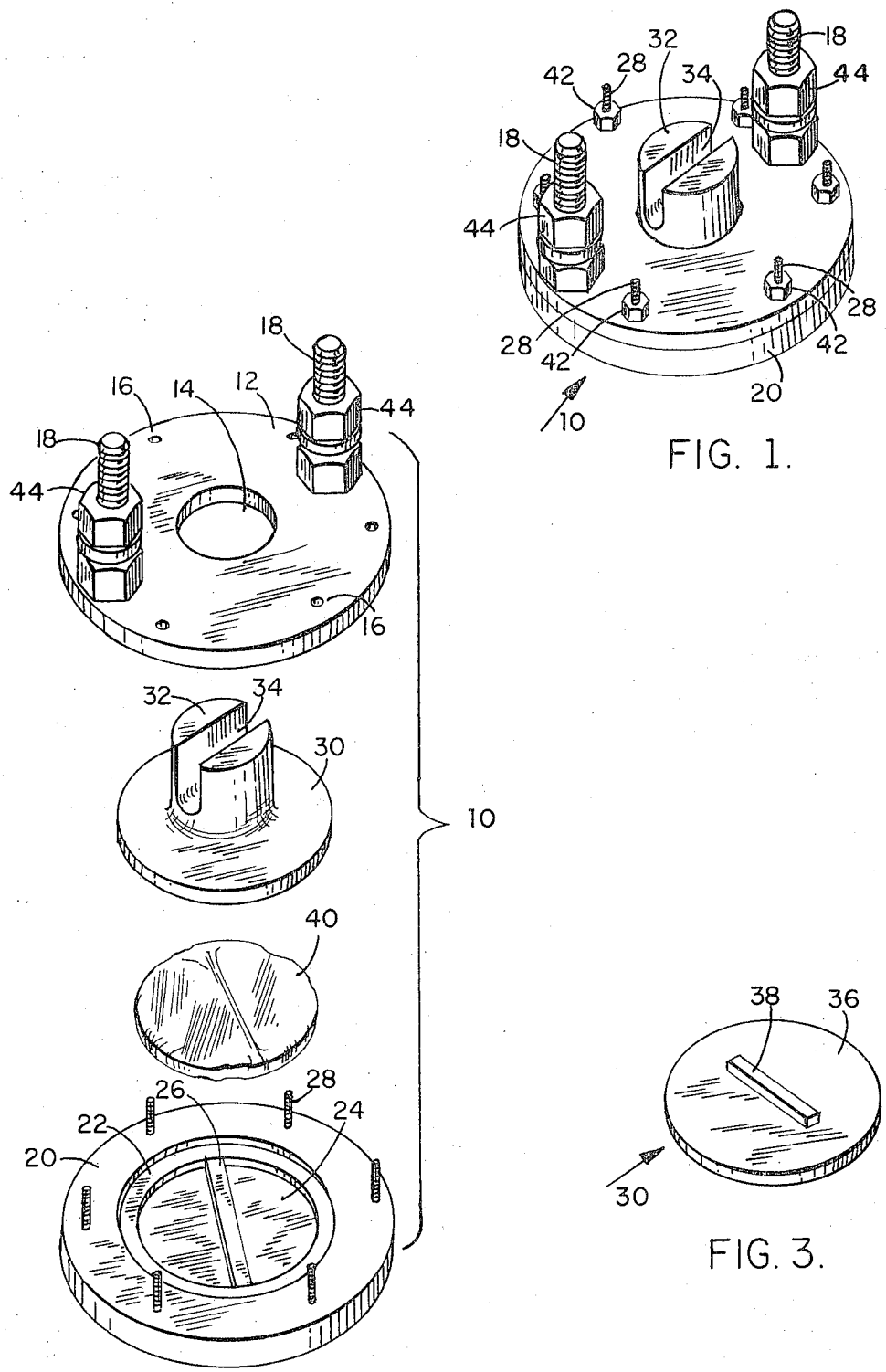
FIG. 1.
FIG. 2.
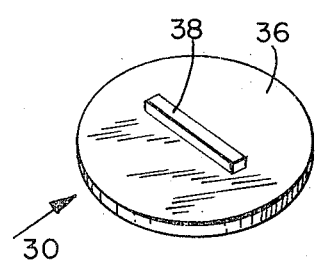
FIG. 3.

TORQUE TRANSFER DRIVE

BACKGROUND OF THE INVENTION

Conventionally two distinct means have been used to transfer power from a driving member, coupled to a source of power, to a driven member: a hard or solid coupled drive and a fluid drive.

In the solid drive systems the driving source is usually connected to the member being driven by a solid shaft or gearing mechanism.

In the fluid drive systems the power source is coupled to the driven member by means of a fluid coupling. This type system is somewhat inefficient because the power source in starting up must rotate the fluid to cause sufficient turbulance to drive the driven member. To achieve improved efficiency complicated mechanisms or hardware is required.

In certain applications, particularly low power vehicles such as snow blowers, neither the solid drive nor the fluid drive mechanisms suffice. Snow blowers currently are driven through a differential or through a straight axle keyed to both wheels or through a straight axle keyed to only one wheel. None of these are satisfactory.

In snow blowers with differential gearing the differential supplies equal torque to both wheels. This can be detrimental to operation of the device since the blower is used on snow or ice and thus, it is very likely that one of the driven wheels will lose traction. If one of the wheels loses traction the other wheel will lose torque in proportion to the amount of traction lost in the one wheel. Consequently, the wheel which loses its traction will spin while the wheel with solid traction remains motionless as, of course, does the snow blower.

This condition has been rectified in an unsatisfactory manner by including therein a second straight shaft with means for manually locking this second shaft to the wheel (a plate keyed to the second shaft and with means provided for locking to a wheel).

The objection to differentials with a manual locking device mounted on one wheel (to render differential inoperative), is that when the manual locking device is in use, both wheels are keyed to one axle, making it difficult to turn because one wheel must skid in order to make the turn. In order to make a turn, the manual locking device has to be disengaged and at times this is difficult. For example, in a snow blower, snow and water may enter and freeze and, thus, it may become necessary to strike the locking device to free it.

The objection to driving mechanisms on devices using a straight axle keyed to both wheels is that the device is difficult to turn because, again, one wheel must skid in order to make the turn.

The disadvantage to devices employing a straight axle keyed to one wheel of a vehicle is that if the drive wheel loses its traction the vehicle comes to a stop.

SUMMARY OF THE INVENTION

Accordingly, it is an object of this invention to provide an improved drive mechanism.

It is another object of this invention to provide a transfer drive wherein the power source is coupled to the driven member through silicone putty.

Briefly, a torque transfer drive is provided by coupling a driving member to a driven member through a mass of silicone putty ("Silly Putty"). In one embodiment for low power vehicles such as snow blowers, silicone putty is disposed in a recess between a driving shaft and a driven wheel of the vehicle. Opposed end plates are connected to the shaft and wheel. A paddle on the end plate connected to the driving shaft "stirs" the silicone putty when the shaft is rotating. The viscosity of the silicone putty is proportional to the torque applied to it by the paddle. When both wheels connected to the drive shaft are turning at approximately the same rate, the silicone putty is very pliable. When one of the wheels slips, however, the silicone putty reacts as a solid to the high impact forces imparted by the paddle.

BRIEF DESCRIPTION OF THE DRAWINGS

The above-mentioned and other features and objects of the invention will become more apparent by reference to the following description taken in conjunction with the accompanying drawings, in which:

FIG. 1 is perspective drawing of a torque transfer drive;

FIG. 2 is perspective drawing of the torque transfer drive of FIG. 1 showing each of the elements thereof separated; and FIG. 3 is a perspective drawing of the inner portion of one of the end plates of the torque transfer drive of FIGS. 1 and 2.

DESCRIPTION OF PREFERRED EMBODIMENT

One embodiment of a torque transfer drive 10 useful for low power vehicles such as snow blowers is illustrated in FIGS. 1 – 3. The torque transfer drive comprises a cover plate 12 having a hole 14 in the center thereof, a plurality of holes 16 about the periphery thereof and a pair of studs 18 on opposing sides.

A first end plate 20 is arranged at the opposite end of the torque transfer drive and includes first and second recessed area 22, 24 with a paddle 26 in the center of recessed area 24. A plurality of studs 28 are arranged about the periphery of end plate 20 so as to mate with holes 16 in cover plate 12.

Intermediate cover plate 12 and first end plate 20 is a second end plate 30 having a shaft 32 with a slot 34 therein. The internal surface 36 of end plate 30 has a paddle 38 thereon.

Disposed intermediate the end plates 20 and 30 is a mass of silicone putty 40.

The unit is assembled by inserting silicone putty 40 into the recess in end plate 20, placing end plate 30 over the silicone putty and by placing cover plate 12 over end plate 30 so that shaft 32 protrudes through hole 14 and studs 28 protrude through holes 16. Finally, a plurality of nuts 42 are tightened over studs 26.

In operation shaft 32 is attached to the shaft of the vehicle and studs 18 are attached to the wheel of the vehicle using nuts 44.

Recess 24 forms a well for the silicone putty and accomodates the paddle 38 so that both paddles face each other. When end plate 30 turns, paddle 38 kneads the silicone putty. When displaced slowly the silicone putty is very pliable, however, under high impact it reacts as a solid. Thus, under normal conditions there will be slip between the end plates as in conventional fluid drives permitting different speeds of rotation of the wheels of a vehicle, and, consequently, permitting relative ease in turning the wheel. However, when one of the wheels of the vehicle loses traction, the high impact applied to the silicone putty will cause it to act as a solid thereby performing as if there is a solid connection between the driving shaft and driven wheel and allow the other wheel to have torque applied thereto so that the vehicle can still move forward.

In addition to providing the desired torque transfer the silicone putty is a good lubricant and provides excellent heat transfer to the outer housing from internal parts which might heat up.

The torque transfer drive illustrated in FIGS. 1 – 3 may replace the manual locking means described hereinbefore on devices with differentials.

On vehicles with straight axles keyed to both wheels the torque transfer device may be used on one or both of the wheels. This permits the wheels to turn at different speeds on the same axle, thus allowing easy turning by transferring the torque of the wheel that has lost its traction to the other wheel in proportion to the speed of the wheel that has lost its traction.

On vehicles with a straight axle keyed to only one wheel the torque transfer drive may be employed on the wheel not keyed or on both wheels. The wheel losing torque would prevent the vehicle from coming to a stop by transferring the torque to the wheel with traction in proportion to the speed of the wheel that has lost its traction, thus preventing the vehicle from coming to a stop. This also permits the vehicle to make an easy turn.

Although the preferred embodiment described herein is directed to a torque transfer drive particularly adapted for use on low power vehicles such as snow blowers, the use of silicone putty to couple a driving and driven member has much wider application presenting a new type of drive somewhere in between the conventional fluid and hard coupled drives. Thus, it is to be understood that the embodiment shown is illustrative only, and that many variations and modifications may be made without departing from the principles of the invention herein disclosed and defined by the appended claims.

I claim:

1. A torque transfer drive for coupling a drive shaft to a driven wheel, comprising:

first means coupled to a drive shaft for rotation therewith and having a raised paddle thereon;

second means axially disposed from said first means and having a recess therein with a second paddle disposed in said recess, said second paddle being axially displaced from said raised paddle;

a mass of silicone putty disposed intermediate said first and second means and within the recess of said second means; and third means for coupling said second means to a driven wheel, whereby torque from a drive shaft will be coupled via said paddles to a driven wheel through said silicone putty.

* * * * *